Dec. 30, 1952   J. A. SLUSS   2,623,238
VISCERA INSPECTION UNIT
Filed July 10, 1950   3 Sheets-Sheet 1
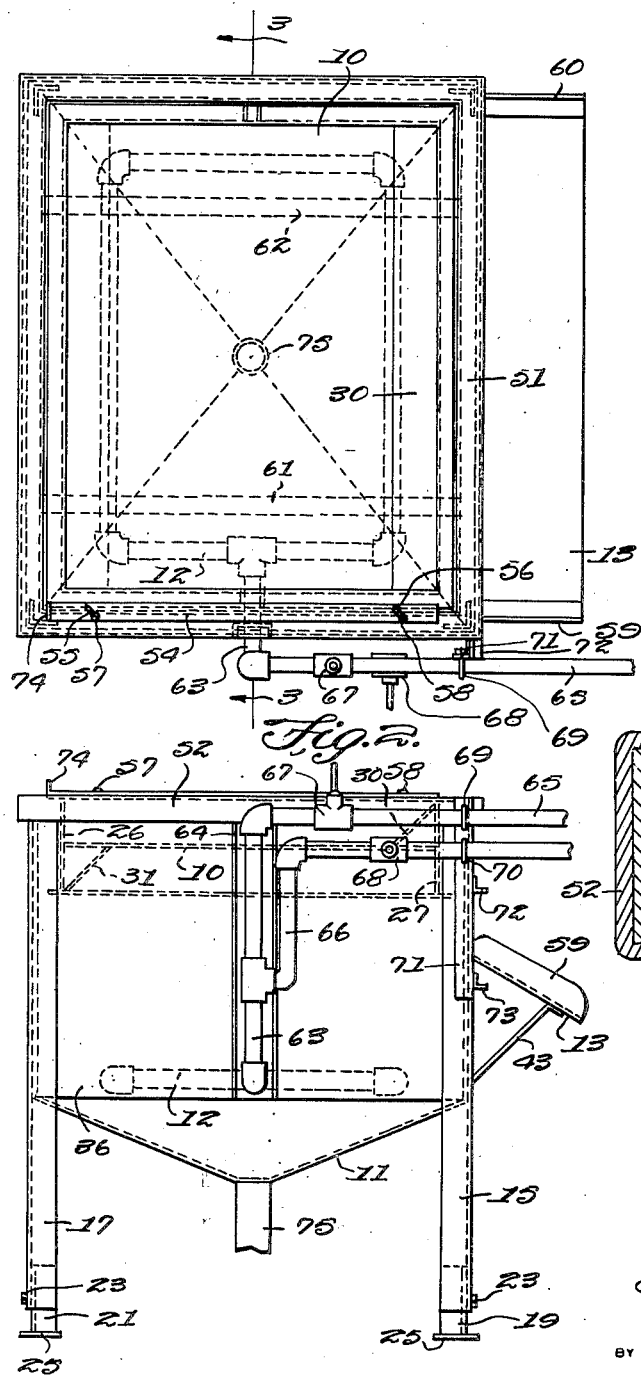
Fig. 1.
Fig. 2.
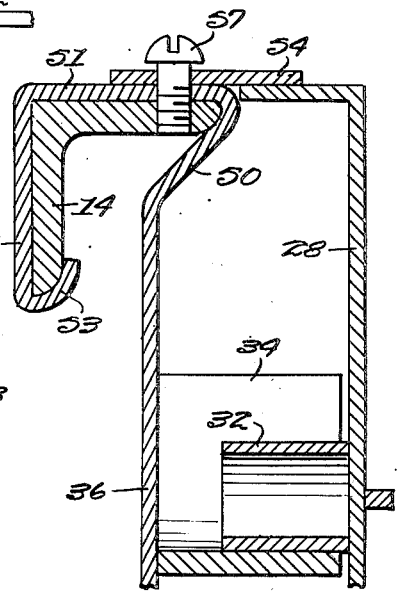
Fig. 7.
INVENTOR.
James A. Sluss,
BY Victor J. Evans & Co.
ATTORNEYS

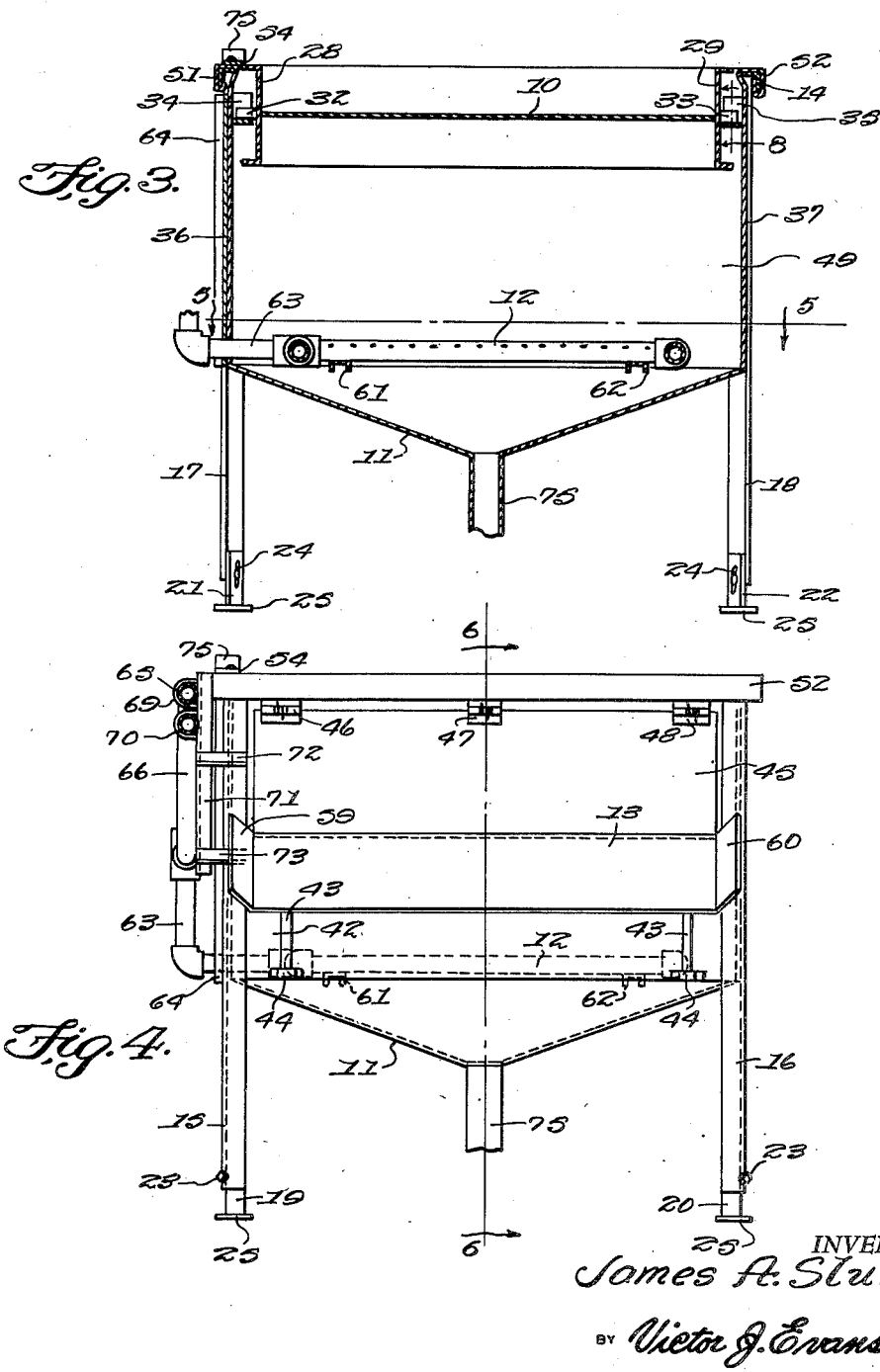

Dec. 30, 1952    J. A. SLUSS    2,623,238
VISCERA INSPECTION UNIT
Filed July 10, 1950    3 Sheets-Sheet 3
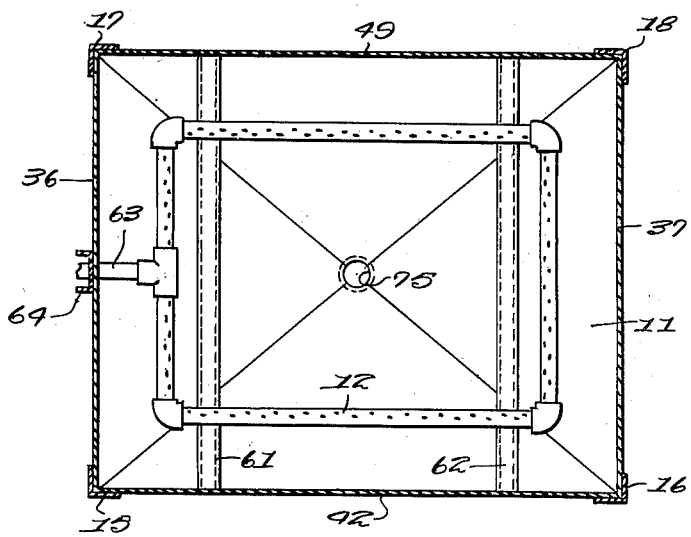
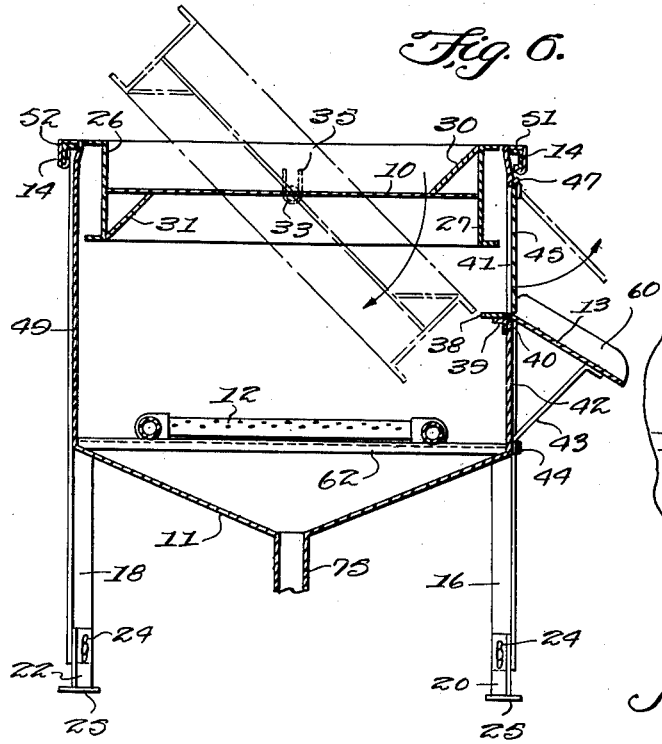
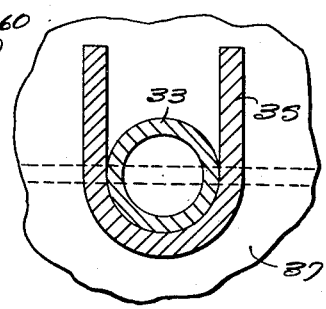
INVENTOR.
James A. Sluss,
BY Victor J. Evans & Co.
ATTORNEYS Patented Dec. 30, 1952

2,623,238

UNITED STATES PATENT OFFICE 2,623,238

VISCERA INSPECTION UNIT

James A. Sluss, Bristol, Va.

Application July 10, 1950, Serial No. 172,909

7 Claims. (Cl. 17—1)

This invention relates to inspection units having trays or pans used for inspection of viscera of hogs, calves, sheep and lambs, and in particular a revolving pan journaled in the upper end of a stand with a sterilizing spray unit positioned below the pan and wherein the pan is mounted for swinging to a position of substantially 45 degrees whereby the viscera is discharged through an opening in the side of the hopper and over an apron to an outside container without handling the viscera by hand.

The purpose of this invention is to provide a viscera inspection unit in which a double pan is pivotally mounted in the upper end of a stand to facilitate inspection of the viscera and in which the parts are so arranged that the viscera may be removed and discharged without handling.

In the conventional inspection unit for viscera and the like where a plurality of pans are used it is necessary to remove the viscera from the pans by hand and the pans are removed and sterilized in separate units. This requires a plurality of different operations and is not satisfactory as it is objectionable to remove the condemned viscera by hand. With this thought in mind this invention contemplates a double pan mounted to revolve in the upper end of a stand wherein during the inspection of the viscera on one pan the other is sterilized and wherein the pan may readily be adjusted to such an angle that the viscera may slide therefrom without handling the viscera by hand.

The object of this invention is, therefore, to provide means for constructing a stand particularly adapted for inspecting viscera in which it is not necessary to handle the viscera by hand.

Another object of the invention is to provide viscera inspection units having a double pan mounted to revolve in the upper end thereof in which a pan in one side is sterilized as viscera is inspected in a pan in the other side.

A further object of the invention is to provide an improved viscera inspection unit which is of a simple and economical construction.

With these and other objects and advantages in view the invention embodies a rectangular shaped pan having a tray with pans in both surfaces thereof journaled in the upper end of the stand with a hopper having a sloping bottom positioned in the stand and with a spray unit positioned in the hopper, and wherein the parts are arranged so that the pan is adjustable to an inclined discharge position with the lower edge coacting with an apron across which the viscera is discharged to an outside container.

Other features and advantages of the invention will appear from the following description taken in connection with the drawings wherein:

Figure 1 is a plan view of the complete unit.

Figure 2 is an end elevational view of the unit.

Figure 3 is a vertical section through the unit taken on line 3—3 of Figure 1.

Figure 4 is a front elevational view of the unit looking toward the discharge apron.

Figure 5 is a sectional plan through the lower part of the unit taken on line 5—5 of Figure 3.

Figure 6 is a vertical section taken on line 6—6 of Figure 4 showing the pan in the discharging position in dotted lines.

Figure 7 is a detail showing a section on an enlarged scale taken substantially on line 3—3 of Figure 1 at one side of the unit and illustrating the pivotal mounting of the double pan.

Figure 8 is a detail showing a section on line 8—8 of Figure 3 through the bearing at one end of the pan.

Referring now to the drawings wherein like reference characters denote corresponding parts the viscera inspection unit of this invention includes a pan having a bottom 10 in a hopper 11 with a spray unit 12 and a discharge apron 13, and the parts are suspended in a stand having a rectangular shaped frame formed with a continuous angle bar 14 at the upper end supported by corner posts 15, 16, 17 and 18.

The posts are provided with adjustable leg sections 19, 20, 21 and 22 which are attached to the lower ends of the posts by bolts 23 in elongated slots 24. Each leg section is provided with a base plate as indicated by the numeral 25.

The pan is formed as shown in detail in Figures 3 and 6 with the bottom 10 positioned midway of channel shaped side members 26 and 27, and similarly shaped end members 28 and 29 and inclined plates 30 and 31 are provided in the sides to facilitate sliding viscera from the pan to the apron 13 with the pan in the position shown in dotted lines as shown in Figure 6.

The ends of the pan are provided with tubular stub shafts 32 and 33 that are positioned in U-shaped bearing elements 34 and 35, respectively positioned on the inner surfaces of end plates 36 and 37 of the hopper 11 and with the pan mounted in this manner it may be rotated on the shafts, as illustrated in Figure 6 wherein, as shown by the dotted lines the viscera slides from the bottom 10 over the inclined plate 30 to a flange 38 of the apron 13, the apron being held in position by an angle 39 positioned over the inner edge 40 from a door opening 41 in the upper part of the end plate 42. The apron is also suspended by braces 43 the lower ends of which are freely slidable in sockets 44 on the outer surface of the hopper.

A door 45 is positioned in the door opening 41, and as illustrated in Figures 4 and 6 the door is pivotally mounted by hinges 46, 47 and 48 whereby as the viscera slides against the inner surface of the door the door opens outwardly to the position shown in dotted lines in Figure 6 and the viscera slides over the apron and into a container.

A wall 49 is provided at the opposite side of the hopper and as illustrated in the enlarged scale detail in Figure 7 the upper edges of the side and end walls bend inwardly with sloping sections 50 extending outwardly over the inner edges of the horizontal flanges of the angle 14, across the upper surfaces of the flanges with sections 51, downwardly over the outer faces of the vertical flanges of the angles with sections 52, and then under the edges of the flanges with arcuate edges 53. With the side and end plates formed in this manner the angle iron frame is substantially covered.

The upper end of the hopper is provided with a sliding bar 54 that is provided with sloping slots 55 and 56 and with screws 57 and 58, respectively extended through the slots. The bar may be moved outwardly, to the position shown in Figures 1 and 7 to hold the pan in position as the viscera is being inspected and when it is desired to tilt the pan for discharging the viscera therefrom the bar 54 is moved outwardly until the inner edge passes over the edge of the flange of the channel 28.

The ends of the apron 13 are provided with outwardly sloping flanges 59 and 60 and with the apron held in position by the angle 39 and socket 44 the apron may readily be removed for cleaning and sterilizing.

The spray head 12 which is formed of perforated tubes, assembled to form a rectangle is positioned on transversely disposed channels 61 and 62 and the supply end of the header is provided with a connection 63 that extends through the wall 36 and upwardly through a channel 64 to a source of supply through a pipe 65. The supply connection 63 is also provided with a supply pipe 66 and the pipes 65 and 66 are provided with quick acting valves 67 and 68, respectively.

With one of the pipes 65 and 66 connected to a supply of cold water and the other to a supply of hot water the pan may readily be sprayed with hot water and then cold water whereby it may first be sterilized and then cooled for use.

The pipes 65 and 66 are connected to a corner of the frame by U-bolts 69 and 70 in a vertical clip angle 71 and the angle 71 is supported from the frame by transversely disposed angles 72 and 73. It will be understood that the pipes may be supported by any suitable means.

The holding bar 54 is provided with a flange 74 at one end by which it may be actuated to hold or release the pan and the bar may be freely mounted or it may be secured in the holding position by the screws 57 and 58.

The hopper 11 is provided with a drain connection 75 that may extend to any suitable point.

It will be understood that modifications may be made in the design and arrangement of the parts without departing from the spirit of the invention.

What is claimed is:

1. An inspection stand comprising a rectangular shaped frame, a hopper having a drain connection in the bottom suspended in the frame, said hopper having an opening extended across the upper part of one side, a pivotally mounted door swingably positioned in said opening, and a pan having a bottom with extended side members pivotally mounted in the upper part of said hopper and positioned whereby with the pan in an inclined position products therein slide through the opening in the side of the hopper.

2. An inspection stand comprising a rectangular shaped frame, a hopper having a drain connection in the bottom suspended in the frame, said hopper having an opening extended across the upper part of one side, a pivotally mounted door swingably positioned in said opening, a pan having a bottom with extended side members pivotally mounted in the upper part of said hopper and positioned whereby with the pan in an inclined position products therein slide through the opening in the side of the hopper, and a spray head positioned in the lower part of the hopper for spraying the underside of the pan with the pan horizontally disposed in the upper end of the hopper.

3. An inspection stand comprising a rectangular shaped frame, a hopper having a drain connection in the bottom suspended in the frame, said hopper having an opening extended across the upper part of one side, a pivotally mounted door swingably positioned in said opening, a pan having a bottom with extended side members pivotally mounted in the upper part of said hopper and positioned whereby with the pan in an inclined position products therein slide through the opening in the side of the hopper, a spray head positioned in the lower part of the hopper for spraying the under side of the pan with the pan horizontally disposed in the upper end of the hopper, and an apron freely mounted on the hopper and positioned through the opening in the side thereof for receiving products from the pan.

4. An inspection stand comprising a rectangular shaped frame, a hopper having a drain connection in the bottom suspended in the frame, said hopper having an opening extended across the upper part of one side, a pivotally mounted door swingably positioned in said opening, a pan having a bottom with extended side members pivotally mounted in the upper part of said hopper and positioned whereby with the pan in an inclined position products therein slide through the opening in the side of the hopper, a spray head positioned in the lower part of the hopper for spraying the under side of the pan with the pan horizontally disposed in the upper end of the hopper, an apron freely mounted on the hopper and positioned through the opening in the side thereof for receiving products from the pan, and a closing bar slidably mounted on the upper end of the stand for retaining the pan in a horizontal position in the upper end of the hopper.

5. An inspection stand comprising a rectangular shaped frame, a hopper having a drain connection in the bottom suspended in the frame, said hopper having an opening extended across the upper part of one side, a pivotally mounted door swingably positioned in said opening, a pan having a bottom with extended side members pivotally mounted in the upper part of said hopper, said pan having beveled surfaces in oppositely positioned corners with the beveled surfaces positioned to coact with the lower end of the opening in the side of the hopper, an inclined apron removably mounted in the hopper and positioned in the lower part of the said opening in the side of the hopper, and a spray head positioned in the lower part of the hopper for spraying the under side of the pan with the pan horizontally disposed in the upper end of the hopper.

6. In a viscera inspection unit, the combination which comprises a rectangular shaped frame having corner posts with a continuous angle iron frame around the upper end, a hopper positioned between the corner posts and having side and end walls the upper edges of which extend over the angle iron frame, said hopper having a drain opening in the lower end and having an opening extended across the upper part of one side, a swingable door positioned to cover the said opening in the side of the hopper, a tray having a bottom with extended side members pivotally mounted in the upper end of the hopper the opposite edges of said tray having beveled surfaces therein, an apron freely mounted in the opening in the side of the hopper and having a flange extended into the hopper and positioned to coact with the beveled surfaces of the tray whereby with the tray in an inclined position products therein slide across the beveled surfaces and on to the said apron, a spray head positioned in the hopper for spraying cold water and hot water selectively against surfaces of the tray, and means temporarily retaining the tray with one side thereof in a horizontal position in the upper end of the hopper.

7. In a viscera inspection unit, the combination which comprises a rectangular shaped frame having corner posts with a continuous angle iron frame around the upper end, a hopper positioned between the corner posts and having side and end walls the upper edges of which extend over the angle iron frame, said hopper having a drain opening in the lower end and having an opening extended across the upper part of one side, a swingable door positioned to cover the said opening in the side of the hopper, a tray having a bottom with extended side members pivotally mounted in the upper end of the hopper the opposite edges of said tray having beveled surfaces therein, an apron freely mounted in the opening in the side of the hopper and having a flange extended into the hopper and positioned to coact with the beveled surfaces of the tray whereby with the tray in inclined positions products therein slide across the beveled surfaces and onto the said apron, a spray head positioned in the hopper for spraying cold water and hot water selectively against the under surface of the tray, means temporarily retaining the tray with one side thereof in a horizontal position in the upper end of the hopper, and means adjusting the height of the stand.

JAMES A. SLUSS.

REFERENCES CITED

The following references are of record in the file of this patent:

UNITED STATES PATENTS

| Number | Name | Date |
| --- | --- | --- |
| 335,940 | Livingston | Feb. 9, 1886 |
| 858,163 | Druzbach | June 25, 1907 |
| 1,531,060 | Allbright | Mar. 24, 1925 |
| 2,084,711 | Smith | June 22, 1937 |
| 2,492,387 | Lundell | Dec. 27, 1949 |